(12) United States Patent
Wang et al.

(10) Patent No.: US 7,843,806 B2
(45) Date of Patent: Nov. 30, 2010

(54) APPARATUS AND METHODS FOR ESTIMATING AND COMPENSATING SAMPLING CLOCK OFFSET

(75) Inventors: Zhongjun Wang, Singapore (SG); Masayuki Tomisawa, Singapore (SG)

(73) Assignee: Wipro Techno Centre (Singapore) Pte Ltd., Singapore (SG)

(*) Notice: Subject to any disclaimer, the term of this patent is extended or adjusted under 35 U.S.C. 154(b) by 131 days.

(21) Appl. No.: 12/116,806

(22) Filed: May 7, 2008

(65) Prior Publication Data

US 2009/0279421 A1    Nov. 12, 2009

(51) Int. Cl.
| H04J 11/00 | (2006.01) |
| H04L 27/00 | (2006.01) |
| H04L 25/00 | (2006.01) |
| H04K 1/10 | (2006.01) |

(52) U.S. Cl. .................. 370/210; 375/259; 375/260; 375/371

(58) Field of Classification Search .................. 370/208, 370/210, 328, 329, 330, 331, 337, 343, 437, 370/462, 477
See application file for complete search history.

(56) References Cited

U.S. PATENT DOCUMENTS

| 2007/0133392 A1* | 6/2007 | Shin et al. .................. 370/210 |
| 2007/0223605 A1* | 9/2007 | Voltz et al. .................. 375/260 |
| 2008/0130813 A1* | 6/2008 | Hwang et al. ............... 375/371 |

OTHER PUBLICATIONS

"A Fine Frequency and Fine Sample Clock Estimation Technique for OFDM Systems" by R Heaton, S. Duncan, B.Hodson published on Mar. 13, 2001.*
A. Batra, J. Balakrishnan, G. R. Aiello, J. R. Foerster, and A. Dabak, "Design of a multiband OFDM system for realistic UWB channel environments," *IEEE Trans. Microwave Theory and Techniques*, vol. 52, No. 9, pp. 2123-2138, Sep. 2004.
WiMedia MBOA, *MultiBand OFDM Physical Layer Specification*, ver. 1.1.5, Jul. 14, 2006.
P.-Y. Tsai, H.-Y. Kang, and T.-D. Chiueh, "Joint weighted least-squares estimation of carrier-frequency offset and timing offset for OFDM systems over multipath fading channels," IEEE Trans. Veh. Technol., vol. 54, No. 1, pp. 211-223, Jan. 2005.

(Continued)

*Primary Examiner*—Seema S Rao
*Assistant Examiner*—Samina Choudhry
(74) *Attorney, Agent, or Firm*—Rabin & Berdo, P.C.

(57) ABSTRACT

An apparatus for sampling clock recovery (SCO) and methods for estimating and compensating SCO are provided. The apparatus comprises a symbol timing adjustment module for shifting forward or backward symbol timing of the transmitted OFDM symbols; a discrete Fourier transform (DFT) processor for performing DFT to an output from the symbol timing adjustment module; a channel estimator for undertaking a channel frequency response estimation based on a channel estimation sequence; a SCO phase rotator for receiving and performing phase shift on the transmitted OFDM symbols of a frame header and a frame payload; an SCO estimation stage for undertaking an SCO estimation based on a pilot-subcarrier-related output of the SCO phase rotator and the CFR estimation; and an SCO compensation distributor for dividing the SCO estimation into integer and fractional portions and then distributing them into the symbol timing adjustment module and the SCO phase rotator, respectively.

5 Claims, 5 Drawing Sheets

OTHER PUBLICATIONS

J. Liu and J. Li, "Parameter estimation and error reduction for OFDM-based WLANs," IEEE Trans. Mobile. Computing, vol. 3, No. 2, pp. 152-163, Apr.-Jun. 2004.

L. Deneire, P. Vandenameele, L. V. D. Perre, B. Gyselinckx, and M. Engels, "A low complexity ML channel estimator for OFDM," IEEE Trans. Commun., vol. 51, No. 2, pp. 135-140, Feb. 2003.

* cited by examiner

US 7,843,806 B2

APPARATUS AND METHODS FOR ESTIMATING AND COMPENSATING SAMPLING CLOCK OFFSET

BACKGROUND OF THE INVENTION

1. Field of the Invention

The present invention relates to apparatus and methods for estimating and compensating sampling clock offset (SCO) for orthogonal frequency division multiplexing (OFDM) communications, and more particularly to the apparatus and the SCO estimation and compensation methods for multi-band OFDM-based ultra-wideband (UWB) systems.

2. Description of Related Art

Multi-band orthogonal frequency division multiplexing (OFDM) based ultra-wideband (UWB) communication has attracted considerable attention in the recent years, as described in the following two references: [1] "A. Batra, J. Balakrishnan, G R. Aiello, J. R. Foerster, and A. Dabak, "Design of a multiband OFDM system for realistic UWB channel environments," IEEE Trans. Microwave Theory and Techniques, vol. 52, no. 9, pp. 2123-2138, September 2004."; [2] "WiMedia MBOA, MultiBand OFDM Physical Layer Specification, ver. 1.1.5, Jul. 14, 2006.". The large bandwidth occupancy of UWB (from 3.1 GHz to 10.6 GHz) and the high efficiency in spectrum utilization provided by OFDM make it possible for the OFDM-UWB technology to achieve very high channel capacity. The OFDM-UWB system can provide low-cost and high-speed wireless connectivity among devices within a short range. The wireless universal serial bus (USB), for example, has adopted the OFDM-UWB radio layer with the data rate up to 480 Mbps.

The extremely wide-band processing has brought a lot of challenges to the OFDM-UWB system design, especially to the design of some crucial receiving modules such as the symbol timing, the carrier frequency offset (CFO) and sampling clock offset (SCO) compensation, as well as the channel frequency response (CFR) estimation. The SCO issue is caused by the sampling clock frequency mismatch between the transmitter and the receiver. Since the UWB device operates at a very high sampling rate (at least 528 Mbps), a small SCO shall cause the phase-shift among the received frequency-domain complex data at all subcarriers, which, after accumulating over a certain period, becomes significant and will seriously degrade the system performance if not well tracked and compensated. Due to its high complexity, the maximum likelihood (ML) phase tracking approach is prohibitive in this case, as described in references [3] "P.-Y. Tsai, H.-Y. Kang, and T.-D. Chiueh, "Joint weighted least-squares estimation of carrier-frequency offset and timing offset for OFDM systems over multipath fading channels," IEEE Trans. Veh. Technol., vol. 54, no. 1, pp. 211-223, January 2005." and [4] "J. Liu and J. Li, "Parameter estimation and error reduction for OFDM-based WLANs," IEEE Trans. Mobile. Computing, vol. 3, no. 2, pp. 152-163, April-June 2004". Moreover, a time-domain interpolator is used to compensate the SCO in reference [3]. However, the time-domain interpolator is implementation expensive in case of high-speed processing.

Therefore, efficient SCO estimation and compensation technologies are critically desirable for improving the performance of the multi-band OFDM-based UWB system.

SUMMARY OF THE INVENTION

One object of the present invention is to provide a method for estimating sampling clock offset (SCO) in a multi-band orthogonal frequency division multiplexing (OFDM)-based ultra-wideband (UWB) system. The SCO estimation method of the present invention is of low complexity and high interference-resistant capability which make it robust even under low signal-to-noise ratio (SNR) conditions.

Another object of the present invention is to provide a method for compensating SCO estimation which is low cost and ease of implementation even under high-speed processing.

According to both objects, an apparatus for sampling clock recovery is provided. The apparatus comprises: a symbol timing adjustment module for receiving transmitted OFDM symbols and shifting forward or backward symbol timing of the transmitted OFDM symbols; a discrete Fourier transform (DFT) processor for performing DFT to an output from the symbol timing adjustment module; a channel estimator for undertaking a channel frequency response (CFR) estimation based on the transmitted OFDM symbols of a channel estimation sequence from an output of the DFT processor; a sampling clock offset (SCO) phase rotator for receiving and performing phase shift on the transmitted OFDM symbols of a frame header and a frame payload from the output of the DFT processor; an SCO estimation stage for undertaking an SCO estimation based a pilot-subcarrier-related output of the SCO phase rotator and the CFR estimation from the channel estimator; and an SCO compensation distributor for dividing the SCO estimation into the integer and fractional portions and then distributing them into the symbol timing adjustment module and the SCO phase rotator, respectively.

According to the first object, a method for estimating SCO for a multi-band OFDM-based UWB system on a plurality of transmitted OFDM symbols is provided. The transmitted OFDM symbols are divided into OFDM symbol groups, indexed with m, each group has K OFDM symbols, indexed with i, i=0, 1, . . . , K−1; each OFDM symbol has R pilot subcarriers, ascendingly indexed with $\{p(0), p(1), \ldots, p(R-1)\}$; the method for obtaining an accumulated normalized SCO (ANSCO) estimation, $\hat{\eta}_{m-1}^{(i)}$, on the ith OFDM symbol in the (m+1)th group, using an ANSCO estimation $\hat{\eta}_m^{(i)}$, on the ith OFDM symbol in the mth group, comprises: grouping R pilot subcarriers into Q pilot pairs; each pilot pair, $\{p(l_1), p(l_2)\}$, having a separation factor, $\beta(l_1,l_2)$; obtaining a channel frequency response (CFR) estimation, $h_r$, on an rth sub-band; obtaining a pilot-subcarrier related input of an N-point inverse discrete Fourier transform (IDFT) processor and a pilot-subcarrier related output of an N-point discrete Fourier transform (DFT) processor; obtaining a residual SCO estimation related value, $\bar{b}_m^{(i)}(l_1, l_2)$, by using a pilot-pair related input of the IDFT processor, a pilot-pair related output of the DFT processor and a pilot-pair related CFR estimation, where the pilot-pair indicates one pilot pair $\{p(l_1), p(l_2)\}$ in the R pilot subcarriers of the ith OFDM symbol in the mth group; summing up Q residual SCO estimation related values, respectively obtained from the Q pilot pairs of the ith OFDM in the mth group to yield a symbol-level residual SCO estimation related value, $\gamma_m^{(i)}$; obtaining a combined residual SCO estimation, $\Delta\hat{\eta}_m$, by using K symbol-level residual SCO estimation related values, $\gamma_m^{(0)}, \gamma_m^{(1)}, \ldots, \gamma_m^{(K-1)}$, respectively obtained from the K OFDM symbols in the mth group; obtaining the ANSCO estimation, $\hat{\eta}_{m+1}^{(i)}$, based on the combined residual SCO estimation, $\Delta\hat{\eta}_m$ and the ANSCO estimation $\hat{\eta}_m^{(i)}$, on the ith OFDM symbol in the mth group.

According to the second object, a method for compensating SCO for a multi-band OFDM-based UWB system is provided. The method comprises: obtaining an accumulated normalized SCO (ANSCO) estimation for a transmitted OFDM symbol; distributing the ANSCO estimation into integer and fractional portions; shifting sample timing at an interval of sampling period in time-domain by an amount of the modulus of the integer portion of the ANSCO estimation; and correcting phase shift in frequency-domain with a rotating factor corresponding to the fractional portion of the ANSCO estimation.

DETAILED DESCRIPTION OF THE INVENTION

The preferred embodiments of the present invention will be described in detail by way of examples and with reference to the above-mentioned figures.

Figure 1:
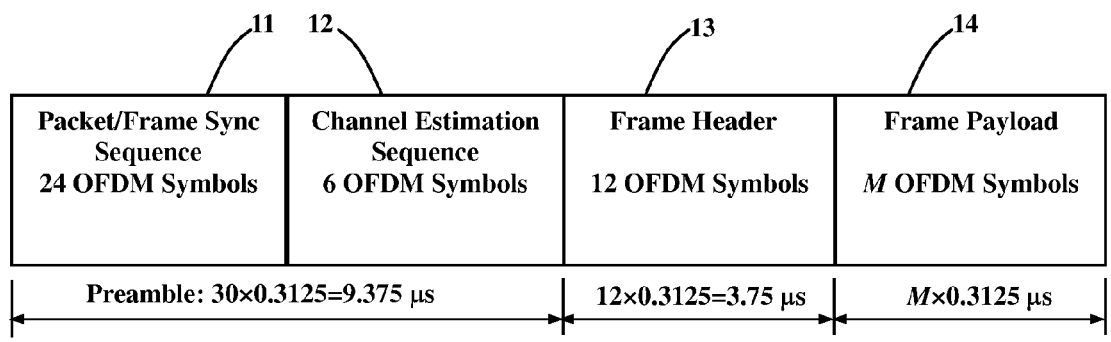
FIG. 1 is a diagram illustrating an OFDM-UWB frame structure.

As shown in FIG. 1, each OFDM-UWB frame is composed of a frame preamble, a frame header 13 and a frame payload 14. The frame preamble consists of 30 OFDM symbols. The first 24 symbols of the frame preamble are referred to as packet/frame sync sequence 11 and the last K (K=6, in this embodiment) symbols of the frame preamble are referred to as channel estimation sequence 12 which is dedicated to channel estimation. The frame header 13 consists of 2K OFDM symbols which convey the information about the current frame's configuration. The frame payload 14 consists of M OFDM data symbols where M is an integer multiple of K, denoted by M=KP. The duration of each OFDM symbol is 0.3125 µs. Thus, the durations of the frame preamble, frame header 13 and frame payload 14 are respectively 9.375 µs, 3.75 µs and M×0.3125 µs. Denote by $\mathbb{Z}_{P_1}^{P_2}$ the finite integer set $\{P_1, P_1+1, \ldots, P_2\}$. For discussion convenience, in the sequel, the OFDM symbol is indexed with n, $n \in \mathbb{Z}_0^{M+3K-1}$, and n=0 indicates the first channel estimation OFDM symbol. The OFDM symbols are divided into groups, each of which consists of K consecutive OFDM symbols and is indexed with m, $m \in \mathbb{Z}_0^{P+2}$, and m=0 indicates the group of K OFDM symbols for channel estimation.

Figure 2:
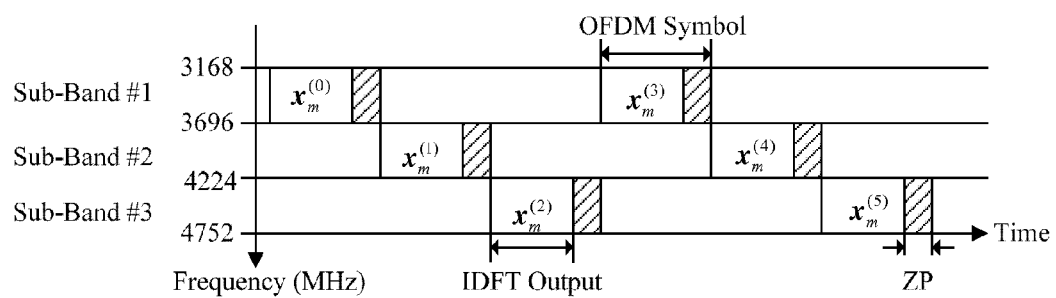
FIG. 2 is a diagram showing one realization of time-frequency code (TFC=1) for the mth multiband OFDM symbol group.

The K OFDM symbols in a group may be transmitted in multibands indexed with r. The center frequency for the transmission of each OFDM symbol is prescribed by a time-frequency code (TFC). FIG. 2 shows one realization of TFC (TFC=1), where the first OFDM symbol of the mth group is transmitted on sub-band #1 (r=1, 3168-3696 MHz); the second OFDM symbol is transmitted on sub-band #2 (r=2, 3696-4224 MHz); the third OFDM symbol is transmitted on sub-band #3 (r=3, 4224-4752 MHz); the fourth OFDM symbol is transmitted on sub-band #1 and so on. Without loss of generality, TFC=1 is used in the following.

Each OFDM symbol employs N=128 subcarriers, which include $Q_1$=112 actual tones (carry useful information), $Q_2$=10 guard tones, and $Q_3$=6 virtual (null) tones. Of the $Q_1$ actual tones, R=12 subcarriers are assigned as pilot tones (pilot subcarriers). The subcarrier frequency spacing is $\Delta f_{sp}$=4.125 MHz. We consider the generation of the nth OFDM symbol (n=Km+i, $i \in \mathbb{Z}_0^{K-1}$, $m \in \mathbb{Z}_0^{P+2}$), and let $$s_m^{(i)} = [s_m^{(i)}(0), s_m^{(i)}(1), \ldots, s_m^{(i)}(N-1)]^T \quad (1)$$

be a vector of N complex data symbols, where $(.)^T$ denotes transpose and $s_m^{(i)}(k)$, $k \in \mathbb{Z}_0^{N-1}$, is the data symbol used for modulating the kth subcarrier. Define an R×1 vector, p=[p(0), p(1), ..., p(R-1)]$^T$=[5, 15, 25, 35, 45, 55, 73, 83, 93, 103, 113, 123]$^T$. Let $Q_0=(Q_1+Q_2)/2$, and $s_m^{(i)}(k)$ is drawn from the quadrature phase-shift keying (QPSK) constellation - denoted as ±c±jc with j=$\sqrt{-1}$ and c=$\sqrt{2}/2$, if $k \in \mathbb{Z}_1^{Q_0} \cup \mathbb{Z}_{N-Q_0}^{N-1}$, and, in particular, $s_m^{(i)}(k)$ is known at the receiver end (for the pilot tones) if $k \in \{p(l)\}_{l=0}^{R-1}$. Also, $s_m^{(i)}(k)$=0, if (k=0)$\cup k \in \mathbb{Z}_{Q_0}^{N-Q_0-1}$. The symbol vector, $s_m^{(i)}$, is fed to an N-point inverse discrete Fourier transform (IDFT) processor that yields an N×1 time-domain vector (IDFT output), denoted by $x_m^{(i)}$ (see $x_m^{(0)}$, $x_m^{(1)}$, $x_m^{(2)}$, $x_m^{(3)}$, $x_m^{(4)}$, and, $x_m^{(5)}$ in FIG. 2). To eliminate the intersymbol interference (ISI) resulting from the time dispersive channels, an $N_g$-point zero-padded (ZP) suffix is appended to each time-domain vector $x_m^{(i)}$, thus forming an OFDM symbol as shown in FIG. 2.

Figure 3:
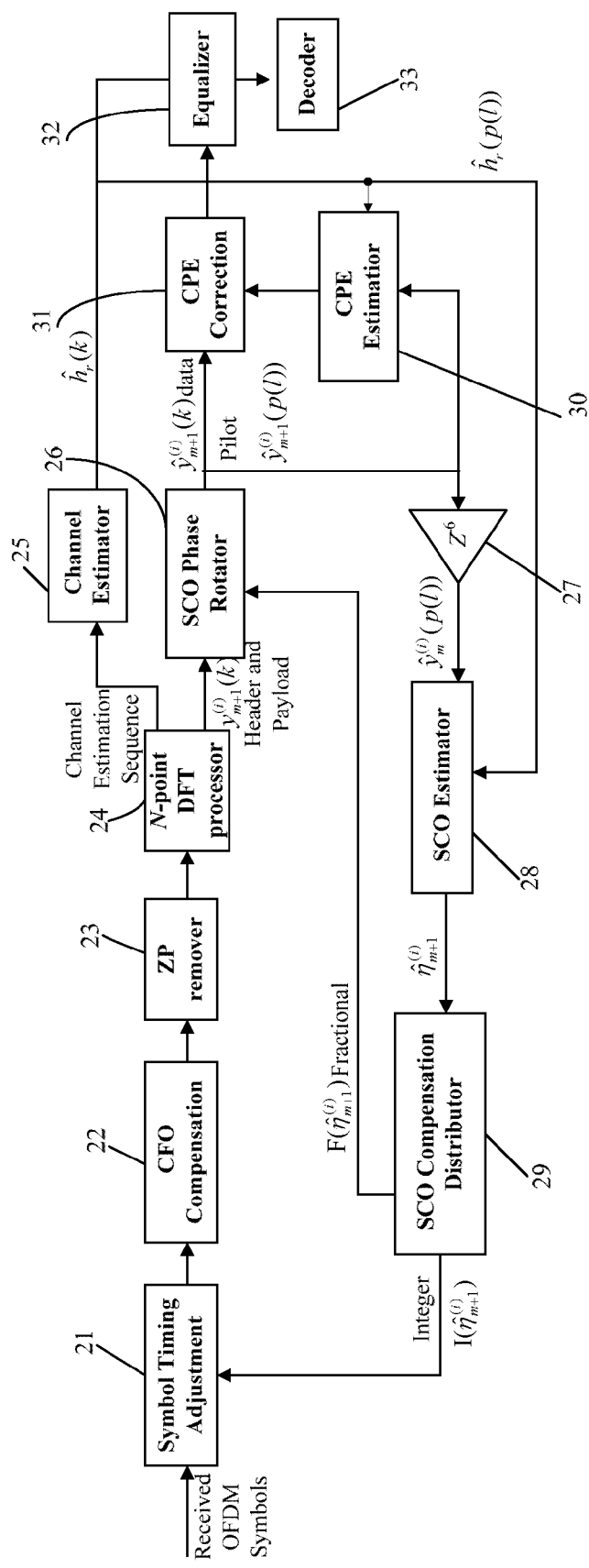
FIG. 3 is a block diagram of an apparatus for sampling clock recovery according to one embodiment of the present invention.

FIG. 3 describes the structure of a sampling clock recovery apparatus 2 of the present invention. In the sampling clock recovery apparatus 2, the transmitted OFDM symbols in the processed group are applied to a symbol timing adjustment module 21. An output from the symbol timing adjustment module 21 is applied to a carrier frequency offset (CFO) compensation module 22. In the CFO compensation module 22, the CFO is first estimated by using the received OFDM symbols of the frame preamble and then compensated according to the CFO estimation. The compensated OFDM symbols from the CFO compensation module 22 are applied to a guard interval remover which is embodied as a ZP remover 23, and the $N_g$-point ZP suffix on each OFDM symbol is removed by the ZP remover 23 using an overlap-and-add method. An output of the ZP remover 23 passes into an N-point discrete Fourier transform (DFT) processor 24 for performing time-domain to frequency-domain conversion. The channel estimation sequence included in the frame preamble of the output from DFT processor 24 is extracted by a channel estimator 25. The channel frequency response (CFR) estimation is performed by the channel estimator 25 using the transmitted and received channel estimation sequences. The OFDM symbols included in the frame header and the frame payload are extracted by an SCO phase rotator 26 for correcting phase shift caused by SCO.

It should be pointed out that the UWB channel of the multi-band OFDM-based UWB system is modeled as an $N_h$-tap finite impulse response filter whose impulse response on the rth sub-band is denoted as $$h_r^{(t)} = [h_r^{(t)}(0), h_r^{(t)}(1), \ldots, h_r^{(t)}(N_h-1)]^T, r \in \mathbb{Z}_1^3 \quad (2)$$

where the superscript $^{(t)}$ indicates time-domain. The corresponding channel frequency response (CFR) on the rth sub-band, $h_r=[h_r(0), h_r(1), \ldots, h_r(N-1)]^T$, is given by $h_r = F_{N_h} h_r^{(t)}$, where $F_{N_h}$ is the first $N_h$ columns of the N-point DFT matrix.

In the present invention, we assume that the UWB channel is invariant over the transmission period of one OFDM frame. The estimation of CFR is thus performed once in a frame by the channel estimator 25 using the received channel estimation sequence included in the frame preamble. We define the obtained estimate of $h_r$ as $\hat{h}_r = [\hat{h}_r(0), \hat{h}_r(1), \ldots, \hat{h}_r(N-1)]^T$, $r \in \mathbb{Z}_1^3$.

We consider that $\epsilon \Delta f_{sp}$ CFO and $\delta T_s$ SCO are present, where $T_s$ is the sampling interval. With the assumption that $N_h \leq N_g$, the output of the DFT processor corresponding to the nth received OFDM symbol (that is, the ith OFDM symbol in the mth group) is given by $$y_m^{(i)}(k) = s_m^{(i)}(k) h_r(k) e^{j(\theta_m^{(i)} + \phi_m^{(i)}(k))} + v_r(k) \quad (3)$$

$i \in \mathbb{Z}_0^{K-1}$, $r = |i|_3 + 1$, and $k \in \mathbb{Z}_0^{N-1}$, where $|.|_3$ stands for the modulo-3 operation, and $v_r(k)$ is the channel noise on the rth sub-band, which is modeled in frequency-domain as a zero mean Gaussian process with variance $\sigma_r^2$. Let $\chi_m^{(i)} = (Km+i)(N+N_g)$, and denote by $\eta_m^{(i)} = \chi_m^{(i)} \delta$ the accumulated SCO (normalized by $T_s$, and if not compensated) when receiving the (Km+i)th OFDM symbol. According to reference [3], we have $$\theta_m^{(i)} \approx 2\pi/N \cdot \epsilon(1+\delta) \chi_m^{(i)} \quad (4)$$

and $$\phi_m^{(i)}(k) \approx \begin{cases} 2\pi k/N \cdot \eta_m^{(i)}, & k \in \mathbb{Z}_0^{N/2-1} \\ 2\pi(k-N)/N \cdot \eta_m^{(i)}, & k \in \mathbb{Z}_{N/2}^{N-1}. \end{cases} \quad (5)$$

Obviously, the phase-shift, $\theta_m^{(i)}$, termed as the common phase error (CPE), is mainly CFO related and is independent of the subcarrier index, k, whereas the phase-shift, $\phi_m^{(i)}(k)$, caused by the SCO, is proportional to k. It should be pointed out that, in the derivation of (3), (4), and (5), $\epsilon$ and $\delta$ are assumed to be small. In particular, in our discussion, we assume that the CFO has been first estimated using the frame preamble and then compensated in all the subsequent OFDM symbols. In other words, $\epsilon$ actually represents the residual CFO (normalized by the subcarrier spacing) after the initial compensation and thus we can safely assume $|\epsilon \oplus| < 0.02$. Observe from (3), (4) and (5), the CPE and the SCO can be decoupled easily.

In order to decouple the CFO and SCO as mentioned above, the apparatus 2 further comprises a CPE mitigation module and an SCO mitigation module. The CPE mitigation module includes a CPE estimation stage 30 and a CPE correction stage 31. The CPE estimation stage 30 undertakes CPE estimation based on the CFR estimation and the pilot vectors (that is, the vectors on pilot subcarriers) extracted from the output of the SCO phase rotator 26. The CPE correction stage 31 compensates the output of the N-point DFT processor 24 based on the CPE estimation from the CPE estimation stage 30. The transmitted OFDM symbols from the CPE correction stage 31 are applied, in turn, to an equalizer 32 and a decoder 33 for further processing.

The SCO mitigation module comprises an SCO estimation stage 28 and an SCO compensation distributor 29. The SCO estimation stage 28 estimates the SCO involved in the (m+1)th group of OFDM symbols based on the pilot vectors (after SCO compensation) which belong to the mth group of OFDM symbols. Thus, the SCO estimation stage 28 performs SCO estimation in a predictive mode as manifested by a delay operation in a delay stage 27. The SCO compensation distributor 29 divides the obtained SCO estimation into integer and fractional portions, and then, distributes them to the symbol timing adjustment module 21 and the SCO phase rotator 26, respectively. The SCO compensation is implemented in the symbol timing adjustment module 21 by shifting forward or backward the sample timing at an interval of sampling period based on the integer portion, and in SCO phase rotator 26 by correcting the phase shift based on the fractional portion.

Figure 4:
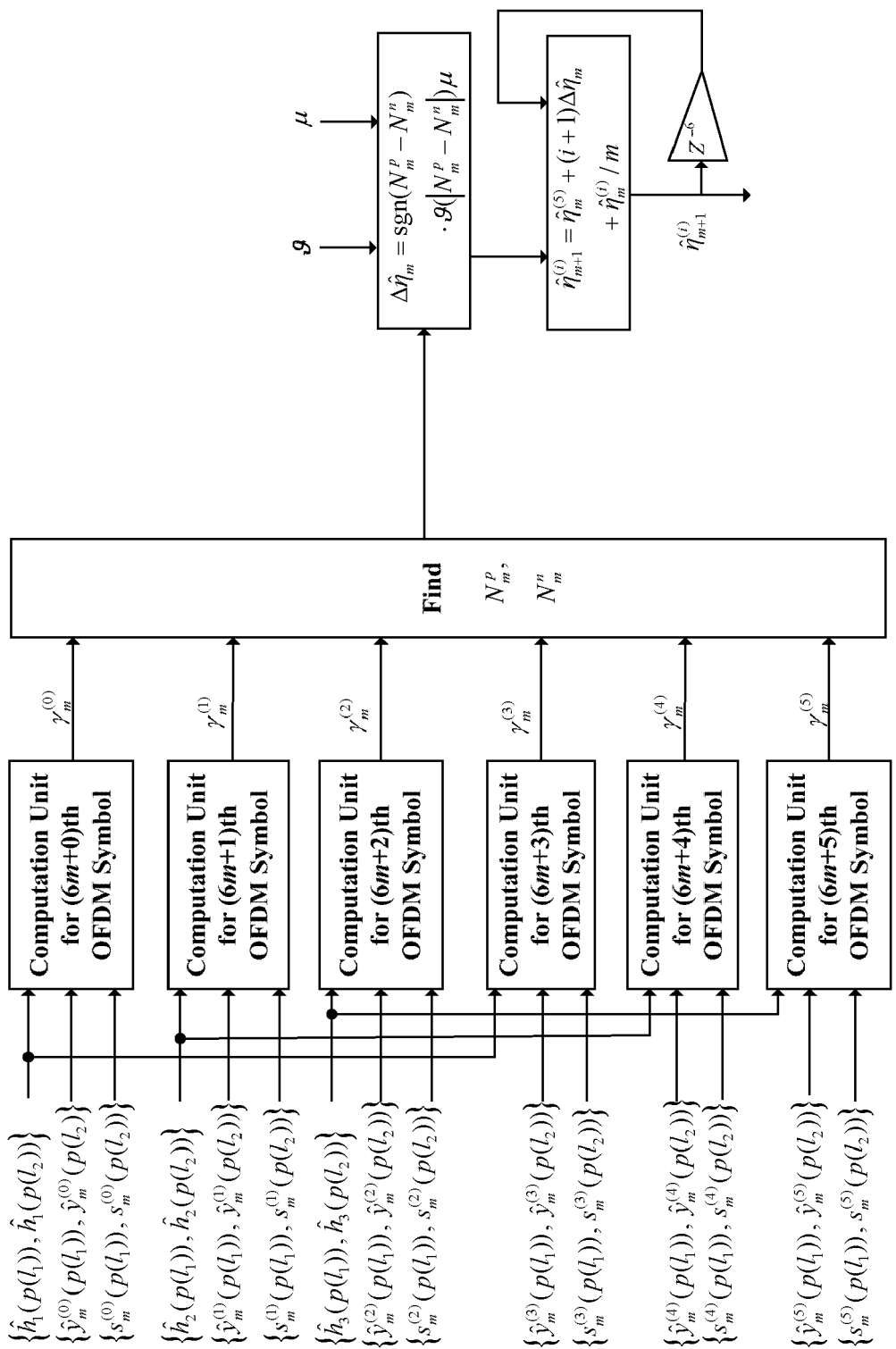
FIG. 4 is a schematic graph illustrating an SCO estimation method in the SCO estimator shown in FIG. 3.
Figure 5:
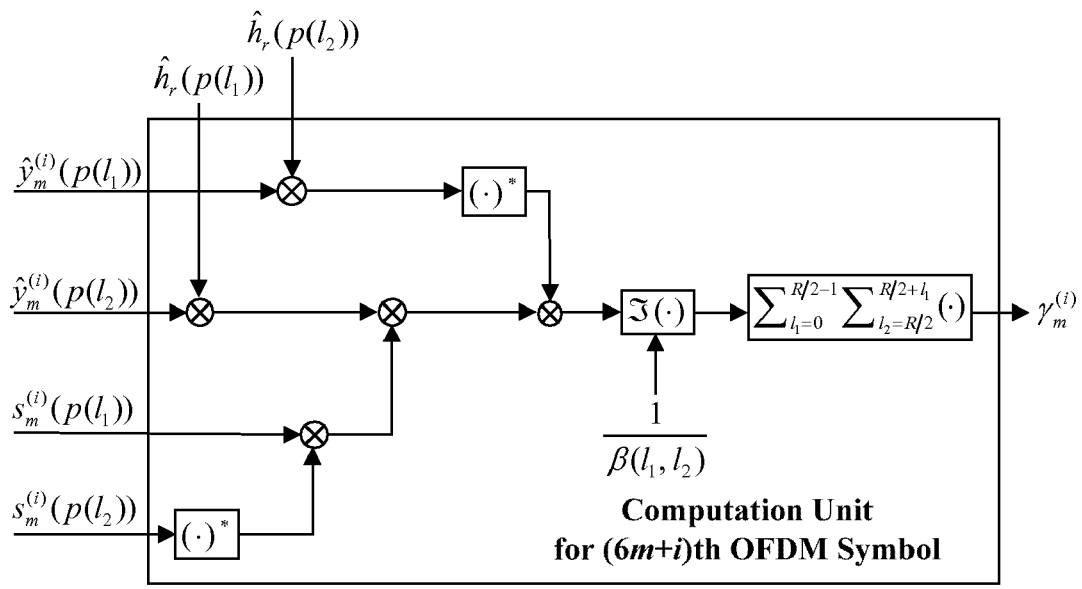
FIG. 5 is a schematic graph describing the detailed structure of the computation unit for (6m+i)th OFDM symbol shown in FIG. 4.

FIG. 4 shows the schematic graph of an SCO estimation method in the SCO estimation stage 28 (see FIG. 3). In this embodiment, suppose that the OFDM symbols in the mth group are being processed. The SCO estimation is to estimate the accumulated normalized SCO (ANSCO), $\eta_{m+1}^{(i)}$, resulting in the ANSCO estimation, $\hat{\eta}_{m+1}^{(i)}$. The SCO estimation method is based on the R pilot subcarriers (pilot tones) embedded in each OFDM symbol and the estimated CFR, $\hat{h}_r$. Suppose that the amount of ANSCO estimation, $\hat{\eta}_m^{(i)}$, in the ith OFDM symbol in the mth group (i.e. the (Km+i)th OFDM symbol) has been already compensated before we use it to estimate the residual SCO denoted by $\Delta \eta_m^{(i)} = \eta_m^{(i)} - \hat{\eta}_m^{(i)}$. We denote by $\hat{y}_m^{(i)} = [\hat{y}_m^{(i)}(0), \hat{y}_m^{(i)}(1), \ldots, \hat{y}_m^{(i)}(N-1)]^T$ the input of SCO estimation stage 28 (see FIG. 3), which is related to the (Km+i)th OFDM symbol. Applying $\hat{h}_r$ to (3), in the absence of noise, we obtain $$e^{j(\theta_m^{(i)} + \Delta \phi_m^{(i)}(k))} = \hat{y}_m^{(i)}(k)/(s_m^{(i)}(k) \hat{h}_r(k)), k \in \{p(l)\}_{l=0}^{R-1} \quad (6)$$

where $$\Delta \phi_m^{(i)}(k) = \begin{cases} 2\pi k/N \cdot \Delta \eta_m^{(i)}, & k \in \{p(l)\}_{l=0}^{R/2-1} \\ 2\pi(k-N)/N \cdot \Delta \eta_m^{(i)}, & k \in \{p(l)\}_{l=R/2}^{R-1}. \end{cases} \quad (7)$$

Referring to the definition of R pilot tones as described above, we group them into a certain number of pairs, denoted by $\{p(l_1), p(l_2)\}$, where $l_1 \in \mathbb{Z}_0^{R/2-1}$ and $l_2 \in \mathbb{Z}_{R/2}^{R/2+l_1}$. Obviously, in this case, the grouping yields $$Q = \sum_{q=1}^{R/2} q = \frac{1}{8} R(R+2)$$

(Q=21, when R=12) pilot pairs in total, each of them is associated with a separation factor, denoted by $\beta(l_1, l_2) := p(l_2) - N - p(l_1) = 10(l_2 - R - l_1)$, $l_1 \in \mathbb{Z}_0^{R/2-1}$ and $l_2 \in \mathbb{Z}_{R/2}^{R/2+l_1}$. Thus, from (6), (7), and (4), we can derive $$e^{j(2\pi\beta(l_1, l_2) \Delta \eta_m^{(i)}(l_1, l_2)/N)} = \frac{e^{j\Delta\phi_m^{(i)}(p(l_2))}}{e^{j\Delta\phi_m^{(i)}(p(l_1))}} \quad (8)$$

$$= \frac{a_m^{(i)}(l_1, l_2) + j b_m^{(i)}(l_1, l_2)}{d_m^{(i)}(l_1, l_2)} l_1 \in \mathbb{Z}_0^{R/2-1},$$

$$l_2 \in \mathbb{Z}_{R/2}^{R/2+l_1}$$

where $a_m^{(i)}(l_1, l_2) = \Re(A_m^{*(i)}(l_1, l_2) B_m^{(i)}(l_1, l_2) C_m^{(i)}(l_1, l_2))$, $b_m^{(i)}(l_1, l_2) = \Im(A_m^{*(i)}(l_1, l_2) B_m^{(i)}(l_1, l_2) C_m^{(i)}(l_1, l_2))$ and $d_m^{(i)}(l_1, l_2) = |A_m^{(i)}(l_1, l_2)|^2$ with $$A_m^{(i)}(l_1, l_2) = \hat{y}_m^{(i)}(p(l_1)) \hat{h}_r(p(l_2))$$

$$B_m^{(m)}(l_1, l_2) = \hat{y}_m^{(i)}(p(l_2)) \hat{h}_r(p(l_1))$$

and $$C_m^{(i)}(l_1, l_2) = s_m^{(i)}(p(l_1))(s_m^{(i)}(p(l_2)))^*.$$

Here, $\Delta\eta_m^{(i)}(l_1,l_2)$, instead of $\Delta\eta_m^{(i)}$, is used to relate itself to the pilot pair $\{p(l_1), p(l_2)\}$. $\Re(x)$ and $\Im(x)$ denote the real and imaginary parts of x, respectively, and $(.)^*$ denotes conjugation. It should be noted that $|s_m^{(i)}(p(l_2))|^2=1$ has been used in the derivation of (8).

Being aware of $|2\pi\beta(l_1,l_2)\Delta\eta_m^i(l_1,l_2)/N|<<1$ and applying Euler's formula, $e^{j\phi}=\cos\phi+j\sin\phi$, and $\sin(\phi)\approx\phi$ (when $|\phi|<<1$) to (8), we have $$\Delta\eta_m^{(i)}(l_1, l_2) \approx \Delta\hat{\eta}_m^{(i)}(l_1, l_2) = \frac{Nb_m^{(i)}(l_1, l_2)}{2\pi\beta(l_1, l_2)d_m^{(i)}(l_1, l_2)}, \quad (9)$$

$l_1 \in \mathbb{Z}_0^{R/2-1}$ and $l_2 \in \mathbb{Z}_{R/2}^{R/2+l_1}$.

By this approximation, no actual trigonometric operation for angle calculation is required. Using the full set of pilot tones, by averaging, the estimation of the residual SCO, $\Delta\hat{\eta}_m^{(i)}$, is obtained as $$\Delta\hat{\eta}_m^{(i)} = \frac{1}{Q}\sum_{l_1=0}^{R/2-1}\sum_{l_2=R/2}^{R/2+l_1}\Delta\eta_m^{(i)}(l_1, l_2) \approx \frac{1}{Q}\sum_{l_1=0}^{R/2-1}\sum_{l_2=R/2}^{R/2+l_1}\Delta\hat{\eta}_m^{(i)}(l_1, l_2) \quad (10)$$

$$= \frac{N}{2\pi Q}\sum_{l_1=0}^{R/2-1}\sum_{l_2=R/2}^{R/2+l_1}\frac{\overline{b}_m^{(i)}(l_1, l_2)}{d_m^{(i)}(l_1, l_2)}$$

$$= \frac{N}{2\pi} \cdot \frac{\sum_{l_1=0}^{R/2-1}\sum_{l_2=R/2}^{R/2+l_1}\overline{b}_m^{(i)}(l_1, l_2)}{\sum_{l_1=0}^{R/2-1}\sum_{l_2=R/2}^{R/2+l_1}d_m^{(i)}(l_1, l_2)}$$

where $\overline{b}_m^{(i)}(l_1,l_2)$ is specified as a residual SCO estimation related value, given by $\overline{b}_m^{(i)}(l_1,l_2):=b_m^{(i)}(l_1,l_2)/\beta(l_1,l_2)$. (The last equality in (10) holds in the absence of noise, as we have used the following proportion property:

$$\frac{x(l)}{y(l)} = \frac{\sum_{l=0}^{Q-1} x(l)}{\sum_{l=0}^{Q-1} y(l)},$$

if $$\frac{x(0)}{y(0)} = \frac{x(1)}{y(1)} = \ldots = \frac{x(l)}{y(l)} = \ldots = \frac{x(Q-1)}{y(Q-1)}.$$

In this way, the division operations can be avoided in obtaining the estimation as shall be clear in the following. In fact, the use of the proportion property here has an important implication in the presence of noise. Observe from (6) that we have $|\hat{y}_m^{(i)}(p(l_1))|=|\hat{h}_r(p(l_1))|$ due to $|s_m^{(i)}(p(l_1))|=1$. Thus, we can obtain $d_m^{(i)}(l_1,l_2)=|\hat{h}_r(p(l_1))|^2|\hat{h}_r(p(l_2))^2|$. The last equality in (10) can be rewritten as $$\Delta\hat{\eta}_m^{(i)} = \frac{N}{2\pi Q}\sum_{l_1=0}^{R/2-1}\sum_{l_2=R/2}^{R/2+l_1}\left(\frac{\overline{b}_m^{(i)}(l_1, l_2)}{d_m^{(i)}(l_1, l_2)} \cdot \frac{|\hat{h}_r(p(l_1))|^2|\hat{h}_r(p(l_2))|^2}{\frac{D_r}{g(l_1,l_2)}}\right) \quad (11)$$

where $$D_r = \frac{1}{Q}\sum_{q_1=0}^{R/2-1}\sum_{q_2=R/2}^{R/2+q_1}|\hat{h}_r(p(q_1))|^2|\hat{h}_r(p(q_2))|^2.$$

It can be seen that the use of the proportion property in (10) is actually equivalent to weighting the residual SCO estimation obtained with the pilot pair $\{p(l_1), p(l_2)\}$ by a weighting factor, $g(l_1,l_2)$, which is the normalized product of CFR magnitudes (squared) on that pilot pair, i.e., $\{p(l_1), p(l_2)\}$. A larger $g(l_1,l_2)$ means a higher carrier to noise ratio (CNR), which translates to a more reliable estimation of the residual SCO on the respective pilot pair $\{p(l_1), p(l_2)\}$, and vice versa. Therefore, the last equality in (10) has performed a CFR-assisted combination of the estimations of the residual SCO using all Q pilot pairs which can reduce the estimation error caused by the channel noise.

Albeit effective in compensation of the noise-impairment effects on the estimation of the residual SCO, in the presence of heavy noise, i.e., under considerably low SNR conditions, the estimation in (10) (last equality) is prone to causing errors which, in turn, may make the SCO tracking unstable due to the limited number of pilot pairs available for use in (10). Being aware of this, a very simple yet effective error suppression technique is devised as described below.

We define from (10)

$$\gamma_m^{(i)} = \sum_{l_1=0}^{R/2-1}\sum_{l_2=R/2}^{R/2+l_1}\overline{b}_m^{(i)}(l_1, l_2) \quad i \in \mathbb{Z}_0^{K-1} \quad (12)$$

and $$\rho_m^{(i)} = \sum_{l_1=0}^{R/2-1}\sum_{l_2=R/2}^{R/2+l_1}d_m^{(i)}(l_1, l_2) \quad i \in \mathbb{Z}_0^{K-1}. \quad (13)$$

Note that, $\rho_m^{(i)}>0$. Then, we can find two values, $N_m^p$, the number of $\gamma_m^{(i)}$'s (among K with $i \in \mathbb{Z}_0^{N-1}$ and $\gamma_m^{(i)}$ being called as a symbol-level residual SCO estimation related value) which satisfy $\gamma_m^{(i)}>0$, and $N_m^n$, the number of $\gamma_m^{(i)}$'s which satisfy $\gamma_m^{(i)}<0$. Let $\mu>0$ be a system design parameter defined as the micro-shift of SCO which can be fixed at a small value, and $\theta=[\theta(0),\theta(1),\ldots,\theta(K)]$ be a predefined non-negative integer vector which satisfies $\theta(l+1)\geq\theta(l)$ and $\theta(l) \in \mathbb{Z}_0^K$. Then, the estimation of the residual SCO, $\Delta\hat{\eta}_m^{(i)}$, in (10) is replaced with $$\Delta\hat{\eta}_m = \text{sgn}(N_m^P - N_m^n)\theta(|N_m^P - N_m^n|) \quad (14)$$

where $\text{sgn}(x)$ equals to 1, if $x>0$, and, $-1$, if $x<0$, otherwise, 0. In this embodiment, Equation (14) combines the K SCO estimations which are obtained independently by applying the last equality in (10) into each individual OFDM symbol of the mth group. The combined estimation is robust and noise resistant in the sense that it does not require using the exact value of $\Delta\hat{\eta}_m^{(i)}$ given by (10), but involves a unique approximation and average process for combining a group of estimations. The combination requires two parameters, $\mu$ and $\theta$, whose settings relate to the maximum permissible SCO, maximum duration of an OFDM UWB frame, and, in particular, the system's tolerance to the residual SCO, i.e., the amount of SCO which has negligible impairment effect on system performance. The first two factors (the maximum permissible SCO and maximum duration) are available from the OFDM-UWB specification in reference [2] while the last factor (the system's tolerance) can be evaluated based on the trial and error method via simulations. As an example, we have used $\mu=1/32$ and $\theta=[0, 1, 2, 2, 2, 3, 3]$ with $K=6$ in the present invention which yields good SCO tracking performance under all system conditions as shall be demonstrated through our numerical simulations. It should be emphasized that the actual setting of $\mu$ and $\theta$ may not necessarily follow this example exactly as the setting itself is actually not very sensitive to the system performance and thus can be easily adjusted, if necessary, for meeting the requirements of different practice designs.

Finally, we obtain the ANSCO estimation, $\hat{\eta}_{m+1}^{(i)}$, in the (m+1)th group by using the known (i.e., previously estimated) ANSCO estimation, $\hat{\eta}_m^{(i)}$, in the mth group and the residual SCO estimation, $\Delta\hat{\eta}_m$, as $$\hat{\eta}_{m+1}^{(i)} = \hat{\eta}_m^{(K-1)} + (i+1)\Delta\hat{\eta}_m + \hat{\eta}_m^{(i)}/m \quad (15)$$

which shall be used to compensate the ith OFDM symbol in the (m+1)th group. The last term on the right-hand side of (15) is used to bridge the time gap between the estimation and compensation due to the processing delay for one group of OFDM symbols.

To avoid using a time-domain interpolator, which is computational and implementation expensive in a high speed processing environment, the present invention also provides a simple SCO compensation method. In this SCO compensation method, the compensation is jointly performed in the time-domain and the frequency-domain. Referring to FIG. 3, suppose that the obtained ANSCO estimation for the ith OFDM symbol in the (m+1)th group, $\hat{\eta}_{m+1}^{(i)}$, from the SCO estimator 28 is applied into the SCO compensation distributor 29. The method for compensating ANSCO of the ith OFDM symbol in the (m+1)th group comprises the following steps:

(1) Using the SCO compensation distributor 29 to divide the ANSCO estimation, $\hat{\eta}_{m+1}^{(i)}$, into the integer and fractional portions denoted by $I(\hat{\eta}_{m+1}^{(i)})$ and $F(\hat{\eta}_{m+1}^{(i)})$, respectively; and obtaining the phase shift, $\phi_{m+1}^{(i)}(k)$, corresponding to the fractional portion of the ANSCO estimation, as $$\varphi_{m+1}^{(i)}(k) = \begin{cases} 2\pi k/N \cdot F(\hat{\eta}_{m+1}^{(i)}), & k \in \mathbb{Z}_0^{N/2-1} \\ 2\pi(k-N)/N \cdot F(\hat{\eta}_{m+1}^{(i)}), & k \in \mathbb{Z}_{N/2}^{N-1} \end{cases} \quad (16)$$

(2) Using the symbol timing adjustment module 21 to shift the sample timing (forward or backward depending on the sign of $I(\hat{\eta}_{m+1}^{(i)})$—forward if $I(\hat{\eta}_{m+1}^{(i)})<0$; backward if $I(\hat{\eta}_{m+1}^{(i)})>0$) by $|I(\hat{\eta}_{m+1}^{(i)})|$ sampling intervals (the modulus of integer portion) in time-domain;

(3) Using the SCO phase rotator 26 to correct the phase shift caused by the fractional portion of ANSCO, $F(\hat{\eta}_{m+1}^{(i)})$, with a rotator factor, $e^{-j\phi_{m+1}^{(i)}(k)}$, in frequency-domain as:

$$\hat{y}_m^{1(i)}(k) = \bar{y}_{m+1}^{(i)}(k)e^{-j\phi_{m+1}^{(i)}(k)}, k \in \mathbb{Z}_0^{N-1} \quad (17)$$

where $\bar{y}_{m+1}^{(i)}(k)$ in place of $y_{m+1}^{(i)}(k)$ is used here to manifest that the output from the DFT processor 24 has been compensated by performing Step (2). With the compensated output, $\hat{y}_{m+1}^{(i)}(k)$, finally obtained in (17), the sampling clock recovery loop is closed and the above SCO estimation procedure shall be repeated for processing the subsequent OFDM symbols.

Figure 6:
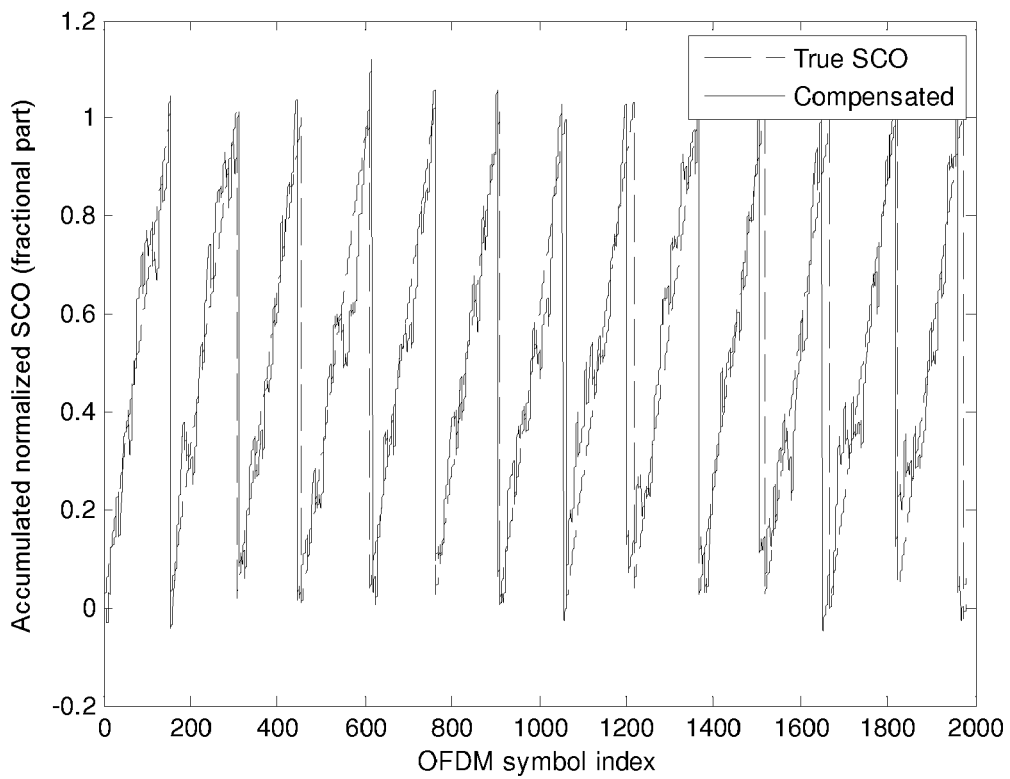
FIG. 6 is a plot illustrating the SCO tracking, wherein the abrupt changes of trajectory indicate compensation of the integer portion of ANSCO, and the residual CFO of $\epsilon=0.0029$ is present.

We shall now use a numerical example to demonstrate the effectiveness of the proposed sampling clock recovery apparatus and methods. FIGS. 6 shows the ANSCO recovery trajectory under a multipath channel environment with SNR=0 dB. The actual SCO introduced is 40 parts per million (ppm). Clearly, the proposed sampling clock recovery apparatus and methods can closely track both the integer and fractional portions of the actual SCO.

The effectiveness of the sampling clock recovery method of the present invention has been verified via numerical results. In the simulations, we consider the OFDM-UWB system with the data rate of 80 Mbps. The selection of a relatively low data rate as example here is for demonstrating the effectiveness of the proposed techniques under low SNR conditions. The UWB channel model CM1, which is a line of sight (LOS) S-V multipath channel has been used. Reference [1] describes the formation of the S-V multipath channel models. Also, TFC=1, and the frame payload is 1024 bytes long. The channel estimation is performed using the maximum-likelihood (ML) algorithm proposed in reference [5]: "L. Deneire, P. Vandenameele, L. V. d. Perre, B. Gyselinckx, and M. Engels, "A low complexity ML channel estimator for OFDM," IEEE Trans. Commun., vol. 51, no. 2, pp. 135-140, February 2003." with the assumption that $N_h=32$. For comparison convenience, perfect symbol timing is assumed whereas the CFO estimation and correction as well as the CPE tracking and compensation are included.

Figure 7:
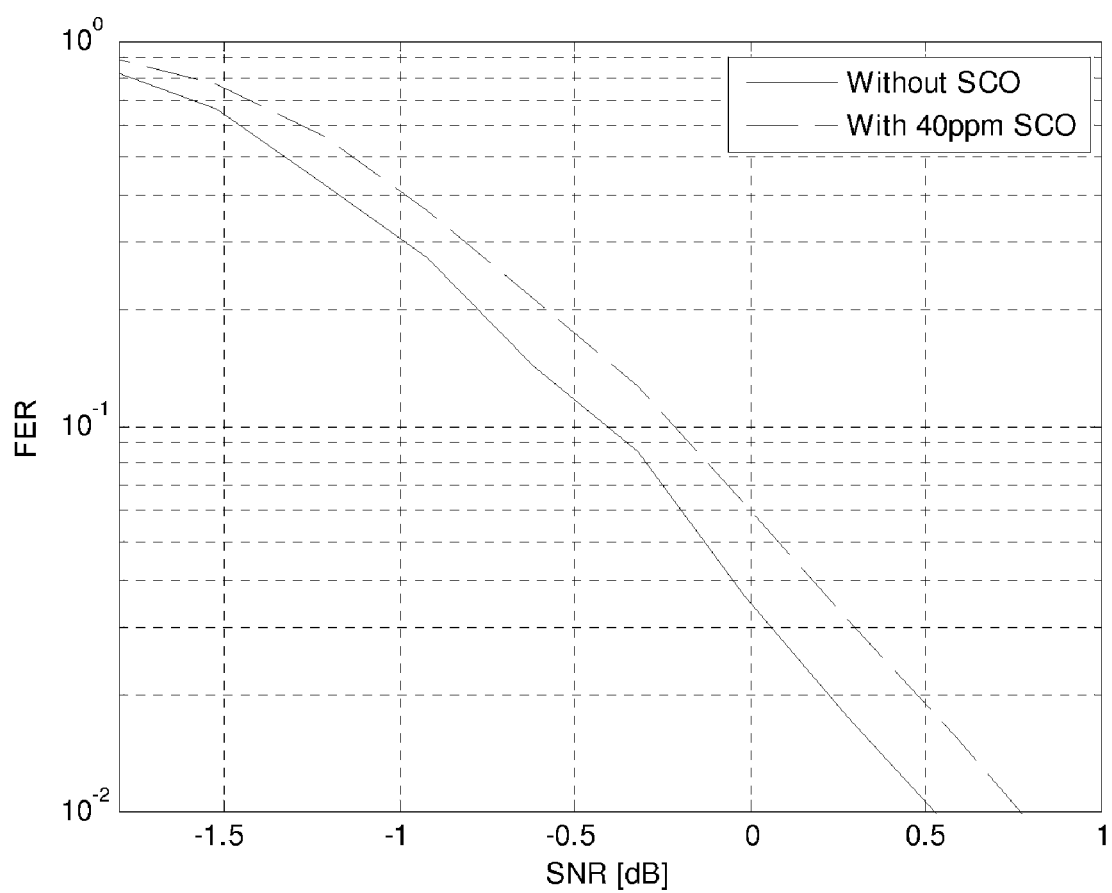
FIG. 7 is a plot demonstrating the high system performance achieved by the sampling clock recovery apparatus shown in FIG. 3.

We assume that 40 ppm SCO is present. This corresponds to the worst case SCO as defined by the OFDM-UWB specification of reference [2]. FIG. 7 shows the frame error rate (FER) performance versus the SNR for the proposed sampling clock recovery (estimation and compensation) scheme. For comparison, FIG. 7 also shows the performance under the assumption that no SCO is present. It can be seen that our proposed SCO estimation and compensation scheme experiences a negligible FER performance loss (about 0.25 dB at FER=$10^{-2}$) in the presence of worst case SCO when compared with the FER performance in the absence of SCO. Taking into consideration that these results are obtained under the low SNR conditions, suffice it to say that the proposed scheme for sampling clock recovery is efficient and effective in multi-band OFDM UWB systems.

Various modifications to the embodiments of the present invention described above may be made. For example, other method steps and modules can be added or substituted for those above. Thus, although the invention has been described above using particular embodiments, many variations are possible within the scope of the claims, as will be clear to the skilled in the art, without departing from the scope of the invention.

We claim:

1. An apparatus for sampling clock recovery for a multi-band orthogonal frequency division multiplexing (OFDM)-based ultra-wideband (UWB) system comprising:
   a symbol timing adjustment module for receiving transmitted OFDM symbols and shifting forward or backward symbol timing of the transmitted OFDM symbols;
   a discrete Fourier transform (DFT) processor for performing DFT on an output from the symbol timing adjustment module;
   a channel estimator for undertaking a channel frequency response (CFR) estimation based on the transmitted OFDM symbols of a channel estimation sequence from an output of the DFT processor;

a sampling clock offset (SCO) phase rotator for receiving and performing a phase shift on the transmitted OFDM symbols of a frame header and a frame payload from the output of the DFT processor;

an SCO estimation stage for undertaking an SCO estimation based on a pilot-subcarrier-related output of the SCO phase rotator and the CFR estimation from the channel estimator; and an SCO compensation distributor for dividing the SCO estimation into integer and fractional portions and then distributing them into the symbol timing adjustment module and the SCO phase rotator, respectively.

2. The apparatus as claimed in claim 1, wherein the apparatus further comprises a carrier frequency offset (CFO) compensation module for applying CFO compensation to the output of the symbol timing adjustment module before the transmitted OFDM symbols are applied to the DFT processor.

3. The apparatus as claimed in claim 2, wherein the apparatus further comprises a guard interval remover between the CFO compensation module and the DFT processor for removing guard interval of each transmitted OFDM symbol.

4. The apparatus as claimed in claim 1, wherein the apparatus further comprises a delay stage which is located between the SCO phase rotator and the SCO estimation stage and for assisting the SCO estimation stage to use the pilot-subcarrier-related output of a current group of received OFDM symbols to estimate SCO involved in the next group of received OFDM symbols in a predictive mode.

5. The apparatus as claimed in claim 1, wherein the symbol timing adjustment module is arranged to shift forward or backward symbol timing based on the integer portion of the SCO estimation, and the SCO phase rotator is arranged to correct phase offset based on the fractional portion of the SCO estimation.

* * * * *